Oct. 8, 1963  D. H. REVELL ETAL  3,106,269
FRAME CONSTRUCTION
Filed Oct. 11, 1960  4 Sheets-Sheet 1

INVENTORS
DONALD H. REVELL
GERALD A. KRAFT

THEIR ATTORNEYS

INVENTORS
DONALD H. REVELL
GERALD A. KRAFT

BY *Glenn & Jackson*

THEIR ATTORNEYS

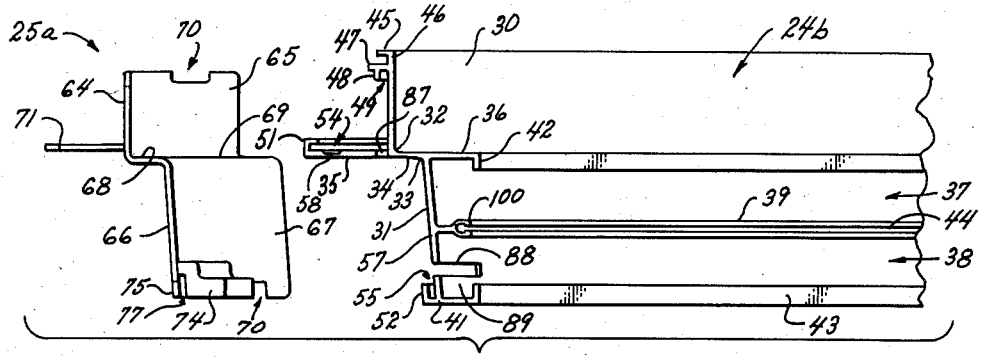
FIG.9
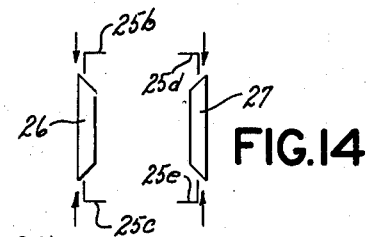
FIG.14
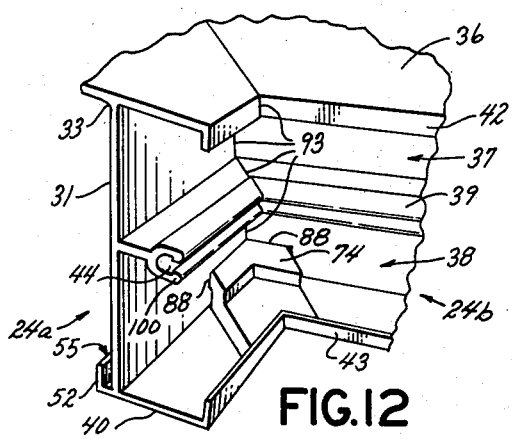
FIG.12
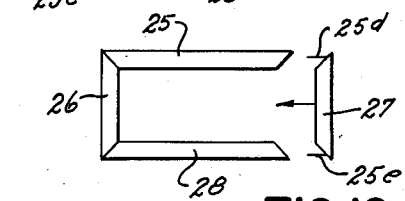
FIG.15
FIG.16
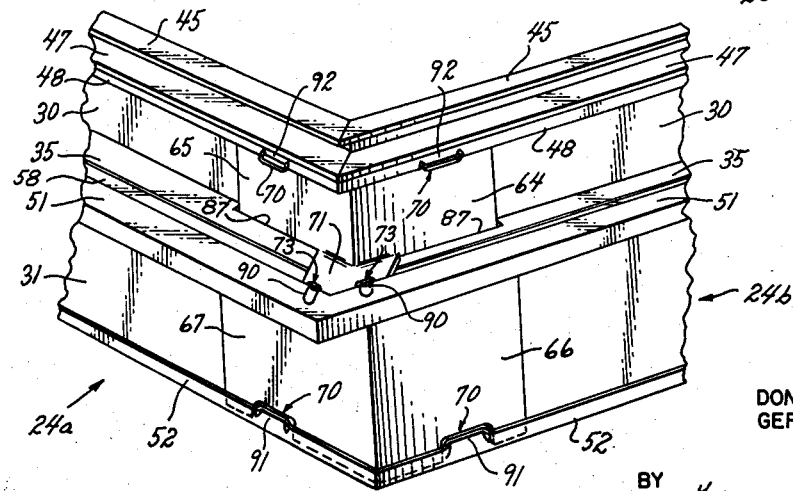
FIG.13
INVENTORS
DONALD H. REVELL
GERALD A. KRAFT
BY
THEIR ATTORNEYS

# United States Patent Office

3,106,269
Patented Oct. 8, 1963

3,106,269
FRAME CONSTRUCTION
Donald H. Revell, Louisville, Ky., and Gerald A. Kraft, Jeffersonville, Ind., assignors to Reynolds Metals Company, Richmond, Va., a corporation of Delaware
Filed Oct. 11, 1960, Ser. No. 61,966
6 Claims. (Cl. 189—36)

This invention relates to an improved frame construction for windows, doors, and the like, as well as to the various improved parts of such frame constructions or the like.

Heretofore, metal frame constructions have normally been fabricated by suitably mitering the abutting ends of the frame members and, thereafter, welding the abutting ends together in order to form the corners or joints of such frame constructions. Because such welding operations require highly skilled labor as well as expensive welding apparatus, attempts have been made to form such metal frame constructions by mechanically joining the frame members together at the corners or joints of the frame constructions. However, it has been found that these prior known mechanically interconnected frame constructions tend to leak at the corners or joints thereof and also lack the necessary structural strength for the intended use thereof.

According to the teachings of this invention, however, a strong, leak-proof and long-lasting frame construction is provided, which is formed from a minimum of novel parts that are simply and inexpensively manufactured and, thereafter, rapidly assembled and mechanically joined together by the method of this invention with a minimum of time and effort and without skilled labor or expensive apparatus.

In particular, one embodiment of this invention provides a frame construction that can be formed from a pluraltiy of frame members which may be identical or differential although it is preferred to cut each member from a single length of extruded metal stock or the like. After the frame members have been cut to the desired lengths and have their ends suitably slotted, the same can be rapidly assembled together to form the frame construction by interconnecting the adjacent ends together with suitable joint elements of this invention, which seal the joints thereof and rigidly interconnect the same together, the frame members and joint elements being secured together by a simple mechanical locking operation. The joints themselves may be either mitered or butt joints.

Therefore, the window manufacturer or the like need only maintain a space-saving supply of various sized lengths of frame member stock and appropriate joint elements therefor, whereby the desired sized frame constructions can be formed by simple cutting and mechanical locking operations, either at the manufacturer's plant or at the site where the frame constructions are to be utilized. Thus, the manufacturer does not have to maintain a large supply of erected frame constructions of various sizes that require excess storage space because, by following the teachings of this invention, various sized frame constructions can be fabricated from a relatively small supply of stock material in a minimum of time and in a simple and effective manner when needed.

Accordingly, it is an object of this invention to provide an improved frame construction having one or more of the novel features set forth above or hereinafter shown or described.

Another object of this invention is to provide an improved frame member for such a frame construction or the like.

Another object of this invention is to provide an improved joint element for such a frame construction or the like.

A further object of this invention is to provide an improved method for making such a frame construction or the like.

Other objects, uses, and advantages of this invention are apparent from a reading of this description, which proceeds with a reference to the accompanying drawings forming a part thereof and wherein:

FIGURE 9 is a view taken on line 9—9 of FIGURE 8.

FIGURE 10 is an elevation view of the assembling operation illustrated in FIGURE 8.

FIGURE 11 is a view similar to FIGURE 10, illustrating the frame members in their assembled positions.

FIGURE 12 is a fragmentary, perspective view of the frame elements in their assembled positions.

FIGURE 13 is a fragmentary, perspective view illustrating the method of staking the frame members to the joint element of this invention to form a completed frame construction.

FIGURES 14–16 are respectively schematic views illustrating the method of assembling the frame construction of FIGURE 1.

Figure 1:
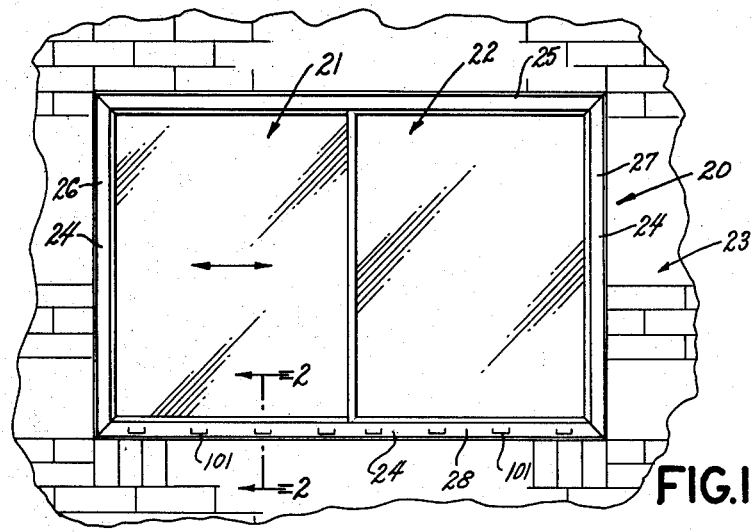
FIGURE 1 is a side elevation view of one embodiment of the frame construction of this invention, the frame construction being utilized as a frame for a window.

While the frame constructions and frame members and elements of this invention are hereinafter described in connection with a window, it is to be understood that the frame constructions and frame members and elements of this invention are also adapted to be utilized for framing doors and other structures, as desired. Accordingly, the structures and methods of this invention are not to be limited only to the embodiments illustrated in the drawings, as the drawings are merely utilized to illustrate one use of this invention.

Referring to FIGURE 1, the frame construction of this invention is generally indicated by the reference numeral 20 and is being utilized to support and frame a pair of glazed window elements 21 and 22 within a vertical wall 23 of a building, house, or the like.

The frame construction 20 comprises a plurality of frame members 24 respectively joined at right angles to each other by a plurality of joint elements 25, FIGURES 6 and 7, in a manner hereinafter described, the frame members 24 defining a head 25, a pair of opposed jamb members 26 and 27, and a sill member 28 of the window frame construction 20.

The window element 21 is adapted to be moved horizontally in the directions indicated by the arrows to open and close the frame construction 20 in the conventional manner, with the window element 22 being fixed in place. However, it is to be understood that the window element 22 can also be constructed to be movable in the horizontal direction, if desired.

Figure 3:
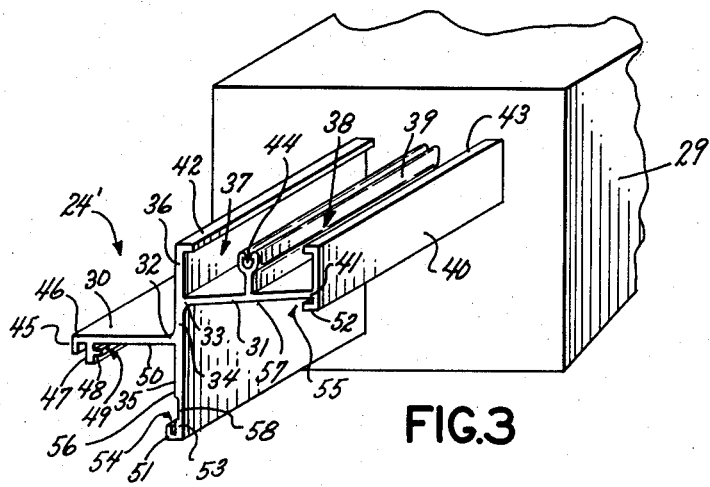
FIGURE 3 is a schematic, perspective view illustrating one method of forming the frame members of this invention.

One of the features of this invention is that the frame construction 20 can be formed from a plurality of frame members 24, the frame members 24 respectively being cut to desired lengths from a single length of frame member stock 24', illustrated in FIGURE 3.

While the length of the frame member stock 24' can be formed of any suitable material and in any suitable manner, the frame member stock 24' illustrated in the drawings is formed of metal, such as aluminum containing metal or the like, extruded by a conventional extruding apparatus 29, FIGURE 3.

After a desired length of frame member stock 24' has been extruded, the same can be anodized, etched, lacquered, enameled, or the like, by well-known processes whereby additional finishing of the frame members 24 subsequently cut thereof is not required.

The frame member stock 24' and, thus, each frame member 24 cut therefrom, comprise a pair of substantially parallel, staggered walls 30 and 31 interconnected together at their respective inner ends 32 and 33 by a transverse wall or web 34, the transverse wall having one coplanar portion 35 thereof extending beyond the wall 30 in a direction away from the wall 31 and another coplanar portion 36 thereof extending beyond the wall 31 in a direction away from the wall 30.

The staggered wall 31 is disposed at a slight angle relative to the other staggered wall 30, with the inner end 33 thereof converging toward the wall 30 for a purpose hereinafter described.

The wall 31 is adapted to define the bottom of a pair of parallel window-receiving guide channels 37 and 38, the guide channel 37 being defined between the portion 36 of the transverse web 34 and an intermediate wall 39 extending outwardly from the wall 31. The guide channel 38 is defined by the intermediate wall 39 and an end wall 40 integrally connected at the end 41 of the wall 31.

The portion 36 of the transverse web 34 has an inwardly directed flange 42 to provide guide means for the window element 22 in a manner hereafter described. Similarly, the end wall 40 has an inwardly directed guide flange 43 to provide guide means for the window element 21.

The intermediate wall 39 is formed with a seal-receiving and retaining channel 44 at the outer end thereof for a purpose hereinafter described.

The other wall 30 is provided with a fascia flange 45 at the outer end 46 thereof. An intermediate wall 47 extends from the wall 30 and has an inwardly directed flange 48 to define a substantially narrow groove or channel 49 between the flange 48 and the side 50 of the wall 30, the groove 49 facing the portion 35 of the transverse web 34.

Similarly, L-shaped flanges 51 and 52 are carried by the respective ends 53 and 41 of the walls 35 and 31 to define substantially narrow grooves of channels 54 and 55 on the respective sides 56 and 57 of the walls 35 and 31, the groove 54 facing the wall 30 and the groove 55 facing the web 34.

The coplanar portion 35 of the transverse web 34 is formed with a reduced cross-sectional thickness at 58 throughout the length thereof to provide a nailing strip for a purpose hereinafter described.

Figure 6:
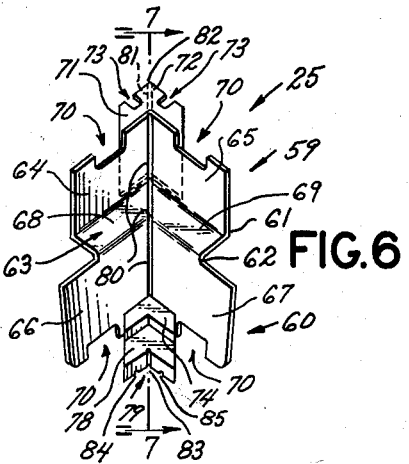
FIGURE 6 is an enlarged, perspective view of one of the joint elements of this invention.
Figure 7:
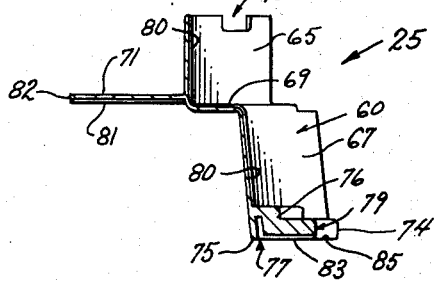
FIGURE 7 is a cross-sectional view of the joint element illustrated in FIGURE 6 and is taken on line 7—7 thereof.

Each corner element or joint element 25, FIGURES 6 and 7, includes a pair of staggered, angled walls 59 and 60 interconnected together at their inner ends 61 and 62 by an angled transverse wall or web 63. The angled wall 60 is disposed at a slight angle toward the angled wall 59 in the same manner that the walls 31 of the frame members 24 are disposed toward the walls 30 thereof. The walls 59, 60, and 63 are illustrated as being right-angled to form right-angled corners for the frame construction 20, but can be formed with any desired angle in order to form corner joints having angles other than right angles, such as for forming a hexagonal frame construction or the like.

The angled wall 59 comprises a pair of integrally interconnected wall sections 64 and 65 disposed at right angles relative to each other. Similarly, the angled wall 60 comprises a pair of integrally interconnected wall sections 66 and 67, and the angled transverse web 63 comprises a pair of integrally interconnected wall sections 68 and 69.

The wall sections 64, 65, 66, and 67 are cut away at the free ends thereof at 70 to provide mechanical locking means in a manner hereinafter described.

An outwardly projecting flat leg 71 extends outwardly from the angled wall 59 at the angle thereof and has a right-angled end 72 cut away at 73 to form mechanical locking means in a manner hereinafter described.

Similarly, another substantially flat leg 74 extends outwardly from the angled wall 60 at the angle thereof in a direction opposite to the leg 71.

The leg 74 is integrally interconnected to the angled wall 60 at a point slightly spaced from the free end 75 thereof, FIGURE 7, and has a joggle 76 which defines an angled groove or well 77 with the angled wall 60 for a purpose hereinafter described. The free end 78 of the leg 74 is provided with a right-angled cutout 79 at the end thereof.

As illustrated in FIGURE 6, the joint element 25 is provided with a sealing groove 80 extending along the entire length of the angle of the walls 59, 60, and 63 at the interior thereof to provide sealing means for a corner joint of the frame construction 20 in a manner hereinafter described. Similarly, a sealing groove 81 is formed in the undersurface of the projecting leg 71 for a like purpose, the sealing groove 81 extending from the angle of the angled wall 59 to the tip 82 of the leg 71. Also, a sealing groove 83 is formed in the undersurface of the leg 74 and extends from the angle of the slot 77 thereof to the angle of the cutout 79 thereof.

If desired, the undersurfaces of the legs 71 and 74 can be provided with other sealing grooves. For example, in the embodiment illustrated in the drawings, the leg 74 is provided with a pair of sealing grooves 84 and 85 disposed substantially parallel with the sealing groove 83 thereof.

The joint elements 25 may be formed of any suitable material and in any suitable manner, and, in the embodiment illustrated in the drawings, the joint elements 25 are formed from metal, such as aluminum containing metal and the like and are formed as integral units, such as by casting or the like. However, it is to be understood that each corner element 25 can be formed from a plurality of parts and suitably interconnected together in any desired manner to form an integral unit, as illustrated in FIGURES 6 and 7.

In order to form the frame construction 20, it is merely necessary to cut the frame member stock 24' into desired lengths to form the frame members 24. After the frame members 24 have been cut from the stock 24' by a simple sawing operation or the like, each frame member 24 has the opposed ends thereof cut away to form a mitered end 86 in the manner illustrated in FIGURE 4. The mitered ends 86 are so constructed and arranged that when adjacent mitered ends 86 of adjacent frame members 24 are brought into abutting relation, the same form a right-angled corner of the frame construction 20.

Figure 4:
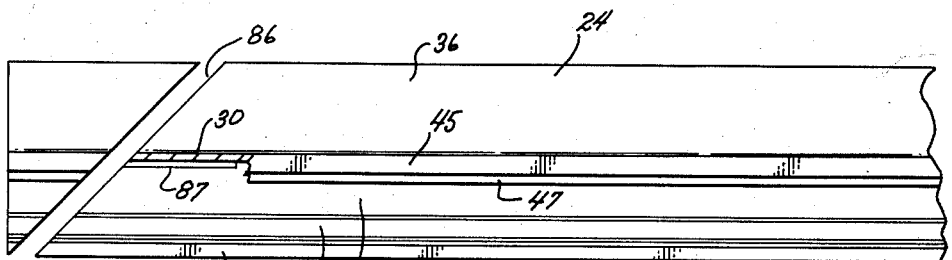
FIGURE 4 is a fragmentary, partially broken away top view of one of the frame members of this invention and illustrates the method of mitering and slotting the same.

After the opposed ends 86 of the frame members 24 have been cut in the manner illustrated in FIGURE 4, the ends 86 of each frame member 24 are slotted by a suitable sawing or cutting operation to provide slots 87 in the portion 35 of the transverse web 34, each slot 87 extending to the respective mitered end 86 thereof, and separating the portion 35 of the web 34 from the wall 30 along the length of the slots 87.

Figure 5:
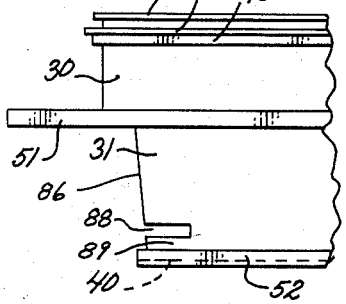
FIGURE 5 is a fragmentary side view of the frame member of FIGURE 4 and illustrates the method of forming another slot therein.

Similarly, slots 88, FIGURE 5, are formed in each end of the wall 31 of each frame member 24 at a point spaced inwardly from the end wall 40 thereof, to define web sections 89 between the respective slot 88 and the end wall 40 for a purpose hereinafter described, each slot 88 intersecting the respective mitered end 86 of the respective frame member 24.

Figure 8:
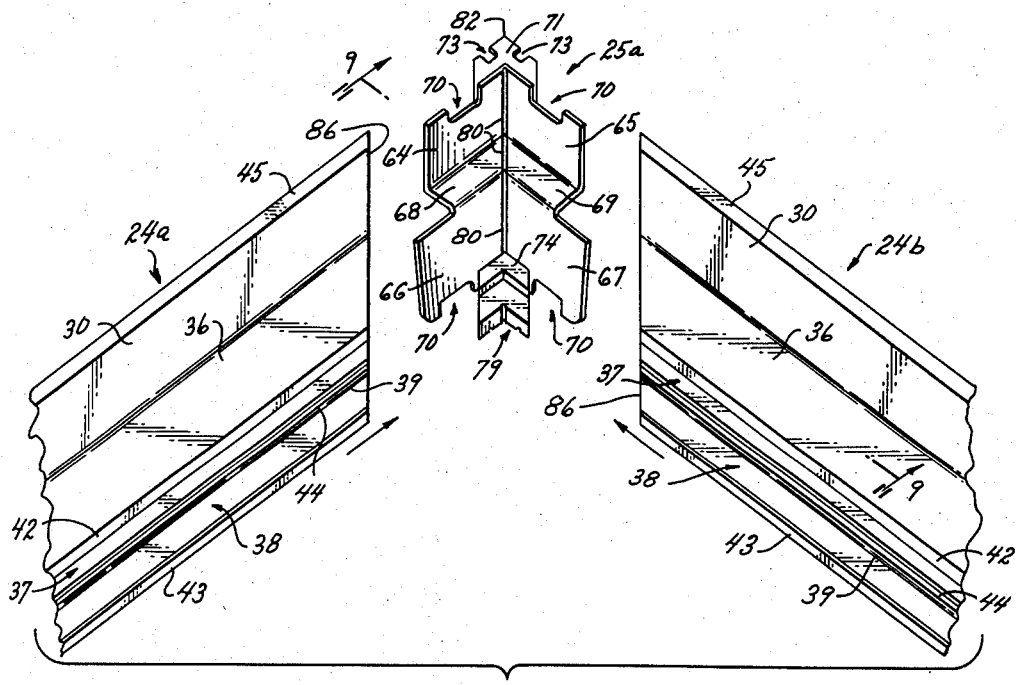
FIGURE 8 is a fragmentary, perspective view illustrating the method of joining together a pair of adjacent frame members with the joint element of this invention.

After the frame members 24 have been mitered and slotted in the above manner, a pair of frame members 24a and 24b can be assembled together by a corner joint element 25a in the manner illustrated in FIGURES 8–10.

In particular, relative movement is effected between a pair of frame members 24a and 24b and a corner joint element 25a in such a manner that the wall sections 64 and 65 of the angled wall 59 of the joint element 25a are respectively received in the slots 87 of the frame members 24a and 24b, whereby the interior surfaces of the angled walls 59, 60, and 63 of the joint element 25a are respectively disposed flush against the exterior surfaces of the walls 30, 31, and 34 of the frame members 24a and 24b, as illustrated in FIGURE 13.

As the frame members 24a and 24b initially receive the respective halves of the joint element 25a, the free ends of the wall sections 64 and 65 of the joint element 25a are received in the grooves 49 of the frame members 24a and 24b, and the free ends 75 of the wall sections 66 and 67 are received in the grooves 55 of the frame members 24a and 24b at substantially the same time that the wall sections 64 and 65 are initially received in the slots 87 of frame members 24a and 24b.

As further movement is effected between the frame members 24a and 24b and the corner joint element 25a, in order to move the mitered ends 86 into abutting relation, the free edges of the projecting leg 71 of the joint element 25a are respectively received in the grooves 54 of the frame members 24a and 24b. Thereafter, the other leg 74 of the joint element 25a is received in the slots 88 of the frame members 24a and 24b, whereby the free edges of the leg 74 are respectively disposed in sliding engagement with the end walls 40 of the frame members 24a and 24b, and the web portions 89 of the frame members 24a and 24b are received in the channel 77 of the leg 74.

The frame members 24a and 24b are thus moved relative to the joint element 25a in the direction illustrated by the arrows in the drawings until the mitered ends 86 thereof are disposed in abutting relation in the manner illustrated in FIGURES 11 and 12. Thereafter, the frame members 24a and 24b are mechanically locked to the joint element 25a by respectively indenting the flanges 51 of the frame members 24a and 24b into the cutaway portions 73 of the leg 71 in the manner illustrated in FIGURES 11 and 13 at 90; indenting the flanges 52 of the frame members 24a and 24b into the cutaway portions 70 of the wall sections 66 and 67 of the angled wall 60 of the joint element 25 in the manner illustrated in FIGURE 13 at 91; and indenting the flanges 48 of the frame members 24a and 24b into the cutaway portions 70 of the wall sections 64 and 65 of the angled wall 59 in the manner illustrated in FIGURE 13 at 92. Such a staking or indenting operation can be easily accomplished by placing a suitably shaped tool against the particular flange of the frame member at a point over the cut out portion of the joint element and hitting the tool with a hammer or the like, the aluminum containing metal of the frame member readily bending into the cutaway portion by a slight impact on the tool.

Thus, not only are the frame members 24a and 24b secured to each other by the joint element 25a through the previously described mechanical operation, but the same are also rigidly held in their right-angled positions by the various angled portions of the joint element 25a, whereby the frame members 24a and 24b cannot be moved out of their right-angled positions.

Prior to the assembly of the frame members 24a and 24b to the joint element 25a, the joint element 25a has a suitable sealant, such as a butyl base sealant, applied to any desired faying surfaces thereof, such as the interior surfaces of the angled walls 59, 60, and 63, and disposed in the respective sealant receiving grooves 80, 81, 83, 84, and 85 thereof. In addition, such sealant is disposed in the angled channel 77 of the leg 74 of the joint element 25a.

In this manner, when the frame members 24a and 24b are assembled to the corner joint element 25a in the manner previously described, the sealant completely seals the corner joint thereof, whereby moisture and the like cannot pass between the interior of the frame members 24a and 24b and the exterior thereof through the seam 93 defined at the abutting mitered ends 86 of the frame members 24a and 24b.

In particular, the sealant in the groove 81 of the leg 71 of the joint element 25a seals the seam 93 between the abutting ends of the web portions 35 of the frame members 24a and 24b, the sealant in the groove 80 formed in the interior surface of the joint element 25a seals the seam 93 between the abutting ends of the walls 30, 31, and 34 of the frame members 24a and 24b, and the sealant in the grooves 83—85 of the leg 74 of the joint element 25a seals the seam 93 between the abutting ends of the end walls 40 of the frame members 24a and 24b. In addition, the sealant disposed between the angled wall 60 of the joint element 25a and the walls 31 of the frame members 24a and 24b prevent moisture and the like from passing between the interior and exterior of the frame members 24a and 24b through the slots 88 thereof. Further, as the frame members 24a and 24b are moved into their assembled positions, the metered edges of the walls 30, 31, and 34 compress the sealant in the groove 80 of the joint element 25a to effect a good seal at the seam 93 thereof.

The widths of the grooves or channels 49, 54, and 55 of the frame members 24 can be so constructed and arranged that the various portions of the corner joint element 25 to be received therein must be press fitted into the respective grooves during the assembling operation to provide a tight fit regardless of manufacturing tolerances. Similarly, the slots 87 and 88 in the frame members 24 can be so constructed that the walls 59 and legs 74 of the joint elements 25 are press fitted therein during the assembling operation. Also, the channels 77 in the legs 74 of the joint elements can be so constructed that the portions 89 of the frame members 24 are press fitted therein. Thus, not only does this press fit relation maintain the frame members 24 in their assembled positions relative to the joint elements 25 in order to permit the subsequent staking operation without additional means for holding the frame members in their assembled positions, but also the press fit relation causes the sealant applied to the corner joint elements 25 to be placed under compression to thereby enhance the sealing effect thereof.

While FIGURES 8–10 illustrate simultaneous joining of the frame members 24a and 24b to the joint element 25a, it is to be understood that one of the frame members 24a or 24b can receive the appropriate half of the joint element 25a, and thereafter, the other frame member 24a or 24b can be joined thereto by receiving its half of the corner joint element 25a in the proper slots and channels thereof.

In practice, the frame construction 20 can be formed in the manner illustrated in FIGURES 14–16, whereby the appropriate halves of a pair of joint elements 25b and 25c are respectively disposed in the appropriate channels and slots of the opposed ends of the jamb 26. Similarly, the appropriate halves of a pair of joint elements 25d and 25e are disposed in the proper channels and slots of the opposed ends of the jamb 27.

Thereafter, relative movement is effected between the jamb 26 and the head 25 and sill 28, as illustrated in FIGURE 15, either simultaneously or in sequence, whereby the left ends of the head 25 and sill 28 are joined to the jamb 26 by the respective joint elements 25b and 25c having the respective halves thereof received in the channels and slots of the head 25 and sill 28.

Subsequently, the jamb 27 is interconnected to the right ends of the head 25 and sill 28 by effecting relative movement therebetween, as illustrated in FIGURE 16, whereby the appropriate halves of the joint elements are received in the proper channels and slots of the head 25 and sill 28 to thus complete the frame construction 20.

The joint elements 25b–e can be staked to the particular frame members 24 as the same are assembled thereto or after the entire frame construction 20 has been formed. Further, the frame construction 20 can be assembled in a suitable jig (not shown) or merely on a flat surface, as desired, because the various channels and slots in the frame members positively align the frame members relative to the joint elements without requiring special aligning means.

The window elements 21 and 22 can then be placed in the frame construction 20 if the same are of the type that are removable. However, if the window elements 21 and 22 are not of a removable type, the same can be placed in the guide channels 37 and 38 of the frame construction 20 before the jab 27 is assembled thereto.

Figure 2:
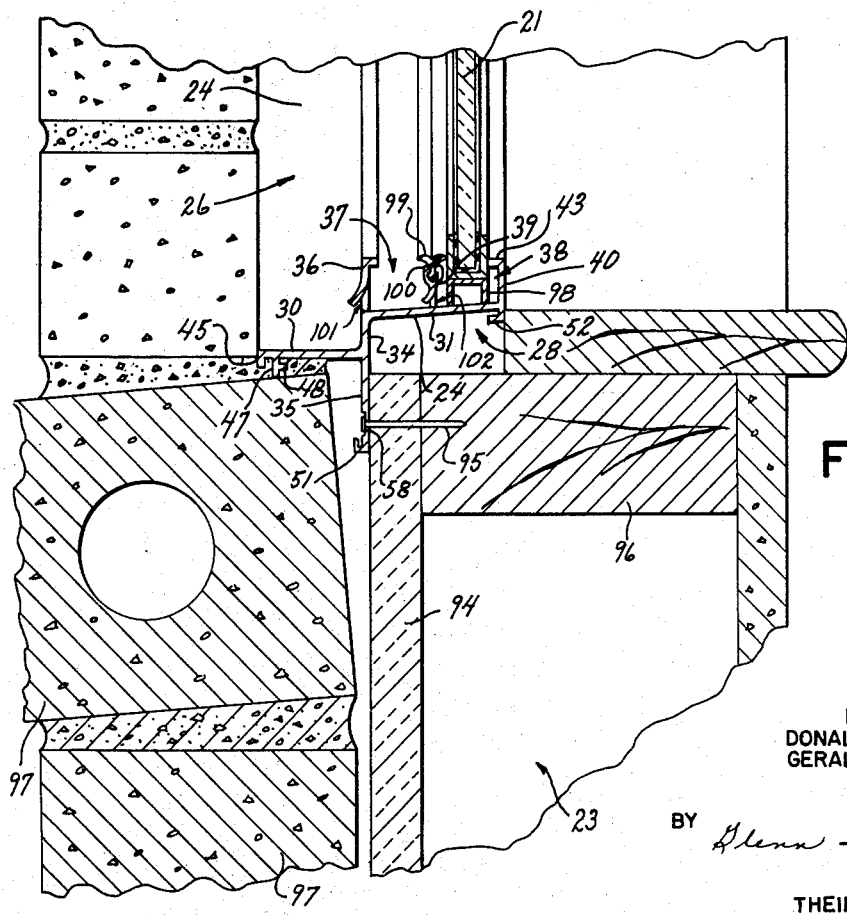
FIGURE 2 is an enlarged, fragmentary, cross-sectional view of the frame construction illustrated in FIGURE 1 and is taken on line 2—2 thereof.

After the frame construction 20 has been formed in the above manner, the same can be disposed in a suitable opening formed in the wall 23 of the building or the like in the manner illustrated in FIGURE 2, whereby the frame members 24 are secured to the sheathing 94 of the wall 23 in any suitable manner, and, in the embodiment illustrated in FIGURE 2, the transverse webs 34 of the frame members 24 are nailed to the sheathing 94 by a plurality of nails 95 passing through the nailing strip 58 of the portions 35 and into the sheathing 94 and studs 96. Thereafter, suitable bricking or facing 97 of the wall 23 is provided, whereby the same covers the portions 35 of the transverse webs 34 of the frame members 24 and terminates short of the staggered walls 30 thereof, the walls 30 providing suitable sills and the like.

In order to support the slidable window element 21 in the window guide channel 38, a separate extruded, U-shaped member 98 may be secured against the wall 31 in the manner illustrated in FIGURE 2 to provide a sliding guide means for the movable window element 21.

Suitable sealing members 99, formed of rubber or the like, are respectively disposed in the seal-receiving channels 44 of the frame members 24 to provide sealing means between the window elements 21 and 22 and the frame members 24 in a manner well known in the art, the seal-receiving channels 44 being so constructed and arranged that the same tend to maintain the sealing members 99 therein without the use of additional adhesive or the like, because of the inwardly directed barb-like flanges 100. However, such adhesive may be utilized if desired.

As previously stated, the staggered walls 31 of the frame members 24 are disposed at slight angles relative to the respective walls 30 and slightly converge toward the same, whereby the walls 31 tend to direct moisture and the like toward the exterior of the frame construction 20 in the manner illustrated in FIGURE 2. Such moisture can be expelled from the window guide channel 37 of the sill member 28 of the frame construction 20 by forming a plurality of suitable weep openings 101 in the portion 36 of the transverse wall 34 of the sill member 28. Also, moisture and the like in the window guide channel 38 of the sill member 28 can be expelled through a plurality of weep openings 102 formed in the intermediate wall 39 of the sill member 28 to the channel 37 thereof, and, thus, out through the weep openings 101.

Therefore, it can be seen that there have been provided improved frame constructions and parts thereof, as well as improved methods of making and assembling the same, whereby a frame construction can be assembled from a relatively few parts in a simple and rapid manner by mechanical locking means without the use of highly skilled labor and without relatively expensive equipment.

Further, because the head, jambs, and sills of the frame construction are each formed from identical frame members, the frame manufacturer need only maintain a supply of various sized lengths of frame member stock and appropriate joint elements therefor, whereby he can fabricate any sized frame construction in a simple and effective manner, when needed either at his plant or at the site of use, thereby eliminating the excess stocking of assembled frame constructions as is provided with prior known constructions.

For example, a national window manufacturer need only maintain a space-saving supply of various sized lengths of pre-finished frame member stock and appropriate corner joints which can be subsequently shipped in bulk quantities to various regional assembly plants, where the particular frame constructions can be fabricated and glazed when needed, without expensive equipment or skilled labor. Thus the national window manufacturer does not have to send assembled and space-consuming frame constructions to its regional distributors, because the regional distributors can be equipped with relatively inexpensive tools for fabricating such frame constructions themselves when needed. Therefore, not only are shipping costs reduced, but also the regional distributors can handle custom jobs without unnecessary ordering delays.

Because the frame constructions of this invention are relatively simple to manufacture, the regional distributors can fabricate frame constructions that are substantially leak-proof and strong through a simple mechanical locking operation of the frame members to the appropriate corner joints, the corner joints providing the necessary sealing means and reinforcement strength to the frame constructions at the joints thereof, whereby substantially unitary frame constructions are provided that are manufactured with a minimum of time and expense. Also, because the frame constructions can be simply manufactured by the methods of this invention, with the corner joints positively aligning, sealing and reinforcing the frame members, a uniform standard of quality is assured by the regional distributors of the national window manufacturer.

Although the drawings disclose the use of frame members having mitered ends, it is to be expressly understood that frame members which merely abut one another may be used in the practice of this invention.

While the form of the invention now preferred has been disclosed as required by the statutes, other forms may be used, all coming within the scope of the claims which follow.

What is claimed is:

1. A frame construction comprising a pair of frame members respectively having ends abutting each other to form a corner of said frame construction, each frame member having a wall portion disposed in a plane that angularly intersects the plane of the wall portion of the other frame member, said wall portions respectively having slots interconnecting with each other at said abutting ends, each frame member having a transverse web interconnected to the respective wall portion and extending beyond the exterior surface thereof, said transverse webs respectively having slots interconnecting with each other at said abutting ends, and a joint element disposed in said slots of said transverse webs and securing said frame members together, said joint element having a leg projecting through said slots in said wall portions and being disposed adjacent the interior surface of said frame members at said abutting edge thereof.

2. A frame construction as set forth in claim 1, wherein each of said transverse webs has channel-defining means, and said joint element has a projection received in said channel-defining means of said transverse webs at said abutting ends.

3. A frame construction as set forth in claim 2, wherein said projection of said joint element is press-fitted in said channel-defining means.

4. A frame construction as set forth in claim 2, wherein said channel-defining means of said transverse webs are respectively staked to said projection of said joint element to secure said frame members together.

5. A frame construction comprising a pair of frame members respectively having ends abutting each other to form a corner of said frame construction, each frame member having a pair of substantially parallel wall portions interconnected together at adjacent inner ends thereof by a transverse web, each transverse web having a portion extending beyond the exterior surface of the respective outermost wall portion, said web portions respectively having slots interconnecting with each other at said abutting edges, the innermost wall portions of said frame members respectively having slots interconnecting with each other at said abutting edges, and a joint element disposed in said slots of said transverse web portions and securing said frame members together, said joint element having a leg projecting through said slots in said innermost wall portions and being disposed adjacent the interior surface of said frame members at said abutting ends thereof.

6. A frame construction as set forth in claim 5, wherein said joint element has a pair of staggered angled wall portions interconnected together at the inner ends thereof by an angled transverse web, one of said angled wall portions being disposed in said slots of said transverse web portions of said frame members and the other angled wall portion carrying said leg at the angle thereof.

References Cited in the file of this patent

UNITED STATES PATENTS

| 612,452 | Ayres et al. | Oct. 18, 1898 |
| 1,694,667 | Peck et al. | Dec. 11, 1928 |
| 2,804,952 | Northdurft | Sept. 3, 1957 |

OTHER REFERENCES

Designing With Aluminum Extrusions, copyright 1950 by Reynolds Metals Company.